(12) United States Patent
Gray et al.

(10) Patent No.: US 11,157,273 B2
(45) Date of Patent: Oct. 26, 2021

(54) SCALED AGILE FRAMEWORK PROGRAM BOARD

(71) Applicant: ServiceNow, Inc., Santa Clara, CA (US)

(72) Inventors: Thomas William Gray, Acworth, GA (US); Madhu Geddam Umapathy, Santa Clara, CA (US); Balaji Cuttackam, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 50 days.

(21) Appl. No.: 16/402,020

(22) Filed: May 2, 2019

(65) Prior Publication Data

US 2020/0348930 A1 Nov. 5, 2020

(51) Int. Cl.
*G06F 8/77* (2018.01)
*G06F 8/20* (2018.01)
*G06F 3/0481* (2013.01)

(52) U.S. Cl.
CPC ............ *G06F 8/77* (2013.01); *G06F 3/04817* (2013.01); *G06F 8/20* (2013.01)

(58) Field of Classification Search
CPC ............ G06F 8/00–78; G06F 3/04817; G06Q 10/06–067
See application file for complete search history.

(56) References Cited

U.S. PATENT DOCUMENTS

| | | | |
|---|---|---|---|
| 6,321,229 B1 | 11/2001 | Goldman | |
| 6,609,122 B1 | 8/2003 | Ensor | |
| 6,678,887 B1 | 1/2004 | Hallman | |
| 6,799,189 B2 | 9/2004 | Huxoll | |
| 6,816,898 B1 | 11/2004 | Scarpelli | |
| 6,895,586 B1 | 5/2005 | Brasher | |
| 7,020,706 B2 | 3/2006 | Cates | |
| 7,027,411 B1 | 4/2006 | Pulsipher | |
| 7,028,301 B2 | 4/2006 | Ding | |
| 7,062,683 B2 | 6/2006 | Warpenburg | |
| 7,131,037 B1 | 10/2006 | LeFaive | |
| 7,170,864 B2 | 1/2007 | Matharu | |
| 7,350,209 B2 | 3/2008 | Shum | |
| 7,392,300 B2 | 6/2008 | Anantharangachar | |
| 7,610,512 B2 | 10/2009 | Gerber | |
| 7,617,073 B2 | 11/2009 | Trinon | |

(Continued)

OTHER PUBLICATIONS

Tanahashi, Yuzuru, and Kwan-Liu Ma. "Design considerations for optimizing storyline visualizations." IEEE Transactions on Visualization and Computer Graphics 18.12 (2012): 2679-2688. (Year: 2012).*

(Continued)

*Primary Examiner* — Doon Y Chow
*Assistant Examiner* — Joanne G Macasiano
(74) *Attorney, Agent, or Firm* — Fletcher Yoder PC

(57) ABSTRACT

Present embodiments include systems and methods for generating a portal accessible to an assigned team member, such that the portal includes selectable icons for toggling between a first visualization indicative of stories and a second visualization indicative of features. Present embodiments include updating the underlying data associated with the specific feature in response to receipt of a user input indicative of a change to at least one of the stories associated with the specific feature.

19 Claims, 11 Drawing Sheets

(56) References Cited

U.S. PATENT DOCUMENTS

| | | | |
|---|---|---|---|
| 7,685,167 B2 | 3/2010 | Mueller | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,933,927 B2 | 4/2011 | Dee | |
| 7,945,860 B2 | 5/2011 | Vambenepe | |
| 7,966,398 B2 | 6/2011 | Wiles | |
| 8,051,164 B2 | 11/2011 | Peuter | |
| 8,082,222 B2 | 12/2011 | Rangarajan | |
| 8,151,261 B2 | 4/2012 | Sirota | |
| 8,224,683 B2 | 7/2012 | Manos | |
| 8,266,096 B2 | 9/2012 | Navarrete | |
| 8,380,645 B2 | 2/2013 | Kowalski | |
| 8,402,127 B2 | 3/2013 | Solin | |
| 8,457,928 B2 | 6/2013 | Dang | |
| 8,478,569 B2 | 7/2013 | Scarpelli | |
| 8,443,750 B2 | 10/2013 | Rangaranjan | |
| 8,554,750 B2 | 10/2013 | Rangaranjan | |
| 8,612,408 B2 | 12/2013 | Trinon | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,745,040 B2 | 6/2014 | Kowalski | |
| 8,812,539 B2 | 8/2014 | Milousheff | |
| 8,818,994 B2 | 8/2014 | Kowalski | |
| 8,819,617 B1 * | 8/2014 | Koenig | G06F 8/70 717/101 |
| 8,832,652 B2 | 9/2014 | Meuller | |
| 8,887,133 B2 | 11/2014 | Behnia | |
| 8,983,982 B2 | 3/2015 | Rangarajan | |
| 9,015,188 B2 | 4/2015 | Behne | |
| 9,037,536 B2 | 4/2015 | Vos | |
| 9,098,322 B2 | 8/2015 | Apte | |
| 9,137,115 B2 | 9/2015 | Mayfield | |
| 9,239,857 B2 | 1/2016 | Trinon | |
| 9,317,327 B2 | 4/2016 | Apte | |
| 9,323,801 B2 | 4/2016 | Morozov | |
| 9,363,252 B2 | 6/2016 | Mueller | |
| 9,412,084 B2 | 9/2016 | Kowalski | |
| 9,467,344 B2 | 10/2016 | Gere | |
| 9,508,051 B2 | 11/2016 | Falk | |
| 9,535,737 B2 | 1/2017 | Joy | |
| 9,557,969 B2 | 1/2017 | Sharma | |
| 9,613,070 B2 | 4/2017 | Kumar | |
| 9,645,833 B2 | 5/2017 | Meuller | |
| 9,654,473 B2 | 5/2017 | Miller | |
| 9,659,051 B2 | 5/2017 | Hutchins | |
| 9,766,935 B2 | 9/2017 | Kelkar | |
| 9,792,387 B2 | 10/2017 | George | |
| 9,805,322 B2 | 10/2017 | Kelkar | |
| 9,852,165 B2 | 12/2017 | Morozov | |
| 10,002,203 B2 | 6/2018 | George | |
| 2012/0079449 A1 * | 3/2012 | Sanderson | G06Q 10/103 717/102 |
| 2013/0090971 A1 * | 4/2013 | Morris | G06Q 10/06 705/7.22 |
| 2016/0335583 A1 * | 11/2016 | Suntinger | G06Q 10/063114 |

OTHER PUBLICATIONS

Patton, Jeff, and Peter Economy. User story mapping: discover the whole story, build the right product. "O'Reilly Media, Inc.", 2014. (Year: 2014).*

Eccles, Ryan, et al. "Stories in geotime." Information Visualization 7.1 (2008): 3-17. (Year: 2008).*

* cited by examiner

SCALED AGILE FRAMEWORK PROGRAM BOARD

BACKGROUND

The present disclosure relates generally to systems and methods for updating development plans.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Developing project plans in a computing environment may be a complex process. To manage this complexity, a number of project planning models and tools have been developed. For example, in various industries, complex projects may be broken down into specific tasks, which themselves may be broken into sub-tasks. Each project may include several tasks, and different projects may have different workers assigned to various roles in the project. These tasks may be prioritized according to various metrics, such as difficulty, urgency, dependency of other tasks on a given task, and the like.

In some industries, timing regarding the finalization and deployment of a task may be an important factor in structuring the project. However, present approaches may lack a structured approach for coordinating timing data between the projects and tasks. Accordingly, present approaches may benefit from improvements regarding developing and structuring of various plans and projects, while taking into account timing requirements, associations between tasks and projects, and a desire for a user friendly interface, the implementation and coordination of which may be difficult to implement in practice.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments include systems and methods for generating a portal accessible to an assigned team member, such that the portal includes selectable icons for toggling between a first visualization indicative of (in the context of a scaled agile methodology) features (which may correspond to a service or a specific functionality to be included as part of an application, such as to fulfill a need of a user of the application) and a second visualization indicative of stories (which may correspond to work items or tasks needed to complete a given feature, e.g., a piece of desired functionality of the respective feature). Thus, in this framework, certain stories may collectively form the features, such that the underlying data between a specific feature and the stories associated with the specific feature may be similar and/or related. To that end, present embodiments include updating the underlying data associated with the specific feature in response to receipt of a user input indicative of a change to at least one of the stories associated with the specific feature. For example, in response to a user changing data for one story associated with the feature, present embodiments include updating the specific feature based on the user change to the data for the one story. In this manner, a team member may toggle between the first visualization and second visualization by making a single selection to quickly see how a change to a story in a first visualization affects a related feature in the second visualization, thereby saving time and resources, while improving the efficiency by which projects are planned using a scaled agile methodology.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
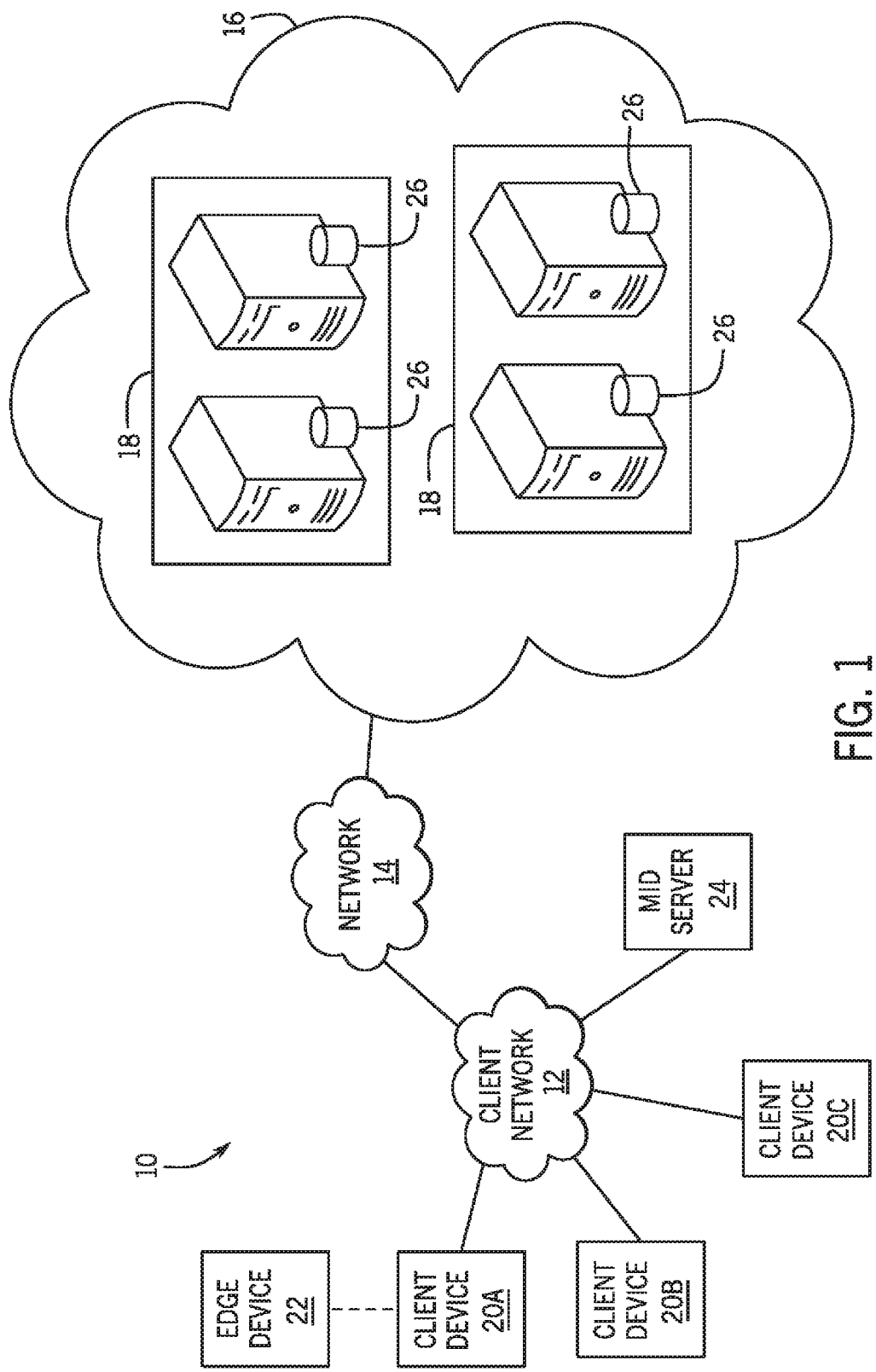
FIG. 1 is a block diagram of an embodiment of a cloud computing system, in accordance with aspects of the present approach.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "an agile methodology," or agile development methodology or agile development model, may refer to a project development methodology characterized by short, fixed schedule of cycles performed in an iterative process, called a "sprint." In contexts employing the agile methodology, a "sprint" may refer to any period of time, such as three weeks or so, during which a team of software developers will complete a software feature. As used herein, "timing data" may refer to information regarding the timeline for completing milestones (e.g., stories or features), the teams and/or team members assigned to complete the milestone, and so forth. As used herein, "a story" may refer to the tasks competed and executed using the agile methodology. A story may correspond to execution tasks or work items needed to complete a given feature. In some implementations, the story may refer to a completed software aspect from a backlog of software features desired to be included in the application. As used herein, a "feature" may refer to a strategy layer including functionality that delivers valuable content to target enterprises and may be comprised of a plurality of stories.

As one example, in the context of a project for delivering voice detection software, the feature may include the strategy layer for delivering voice detection software, and may include a first story corresponding to a first work task indicative of acquiring audio streams, a second story corresponding to a second work task indicative of processing the audio streams, and so forth. That is, in contexts employing the agile methodology, a plurality of stories may make up an overall feature.

As another example, a mobile ride sharing app may include features and stories. The feature would be that driver's rating received from riders. Stories may include, first, providing a rider a prompt for rating their driver at the conclusion of a ride, second, providing riders with a 1-5 star rating choices, third, providing riders with a place to add comments, and fourth, letting riders cancel or submit ratings.

Indeed, certain enterprises may employ an agile methodology to facilitate project and task planning by prioritizing and sequencing different task types, such as addressing defects, problems, incident tasks, and stories. By having these task types in one location, enterprises may save time, planning resources, and computational resources that would otherwise be expended in toggling between various programs. In one example, enterprises may employ a scaled agile methodology, such as the Scaled Agile Framework Enterprise (i.e., SAFe™), to train teams assigned to various stories, build a social network within the enterprise, and organize the overall Agile Release Train (ART) by aligning all teams on the ART to a shared mission and vision. That is, SAFe™ may provide a platform for iteratively planning in accordance with agile methodology.

However, in certain scaled agile methodologies, the aspects defining the feature and the aspects defining the stories may be isolated with respect to one another. As a result, a team member may be required to open multiple windows, login to their account again, and perform other steps, when the team member wishes to alternate between accessing the features and the stories. Alternatively, the team member incorporating the changes to the stories and may be unaware of, or lack the tools necessary for determining, how such a change affects the feature associated with the modified stories. As a result, a change in a story may result in an unwanted change to the associated feature, and the team member who made the change may be unaware of how the change negatively affected the feature. Accordingly, present approaches may benefit from improvements regarding developing techniques for toggling between various stories and features, while updating timing data, associations between the stories and features, and a desire for a user friendly interface, the implementation and coordination of which may be difficult to implement in practice.

Present embodiments include systems and methods for generating a portal accessible to an assigned team member, such that the portal includes selectable icons for toggling between a first visualization indicative of the stories and a second visualization indicative of the features. As mentioned above, certain stories may collectively form the features, such that the underlying data between a specific feature and the stories associated with the specific feature may be similar and/or related such that changes to one may affect the other. To that end, present embodiments include updating the underlying data associated with the specific feature in response to receipt of a user input indicative of a change to at least one of the stories associated with the specific feature. For example, in response to a user changing the timing data for one story associated with the feature, present embodiments include updating the specific feature based on the user change to the timing data for the one story. In this manner, a team member may toggle between the first visualization and second visualization by making a single selection to quickly see how a change to a story in a first visualization affects a related feature in the second visualization, thereby saving time and resources, while improving the efficiency by which projects are planned using a scaled agile methodology.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB)

platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

As may be appreciated, the respective architectures and frameworks discussed with respect to FIG. 1 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion. For example, a computing system having access to the network 14 may be able to access and customize certain resource allocation data based on an identity of the entity (e.g., user) associated with the computing system and/or based on the layer of the multi-layer resource allocation hierarchy to which the user is assigned.

Figure 2:
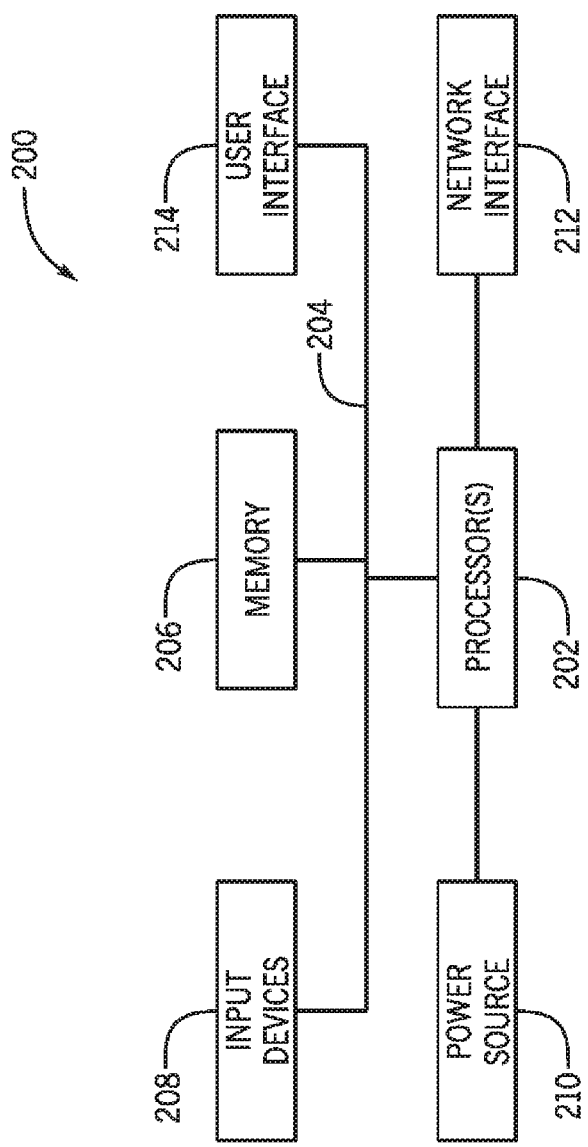
FIG. 2 is a block diagram of a computing device utilized in a computing system that may be present in FIG. 1, in accordance with aspects of the present approach.

By way of background, it may be appreciated that the present approach may be implemented using one or more processor-based systems such as shown in FIG. 2. Likewise, applications and/or databases utilized in the present approach may be stored, employed, and/or maintained on such processor-based systems. As may be appreciated, such systems as shown in FIG. 2 may be present in a distributed computing environment, a networked environment, or other multi-computer platform or architecture. Likewise, systems such as that shown in FIG. 2, may be used in supporting or communicating with one or more virtual environments or computational instances on which the present approach may be implemented.

An example computer system may include some or all of the computer components depicted in FIG. 2 and facilitate implementing the techniques disclosed herein. FIG. 2 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 3:
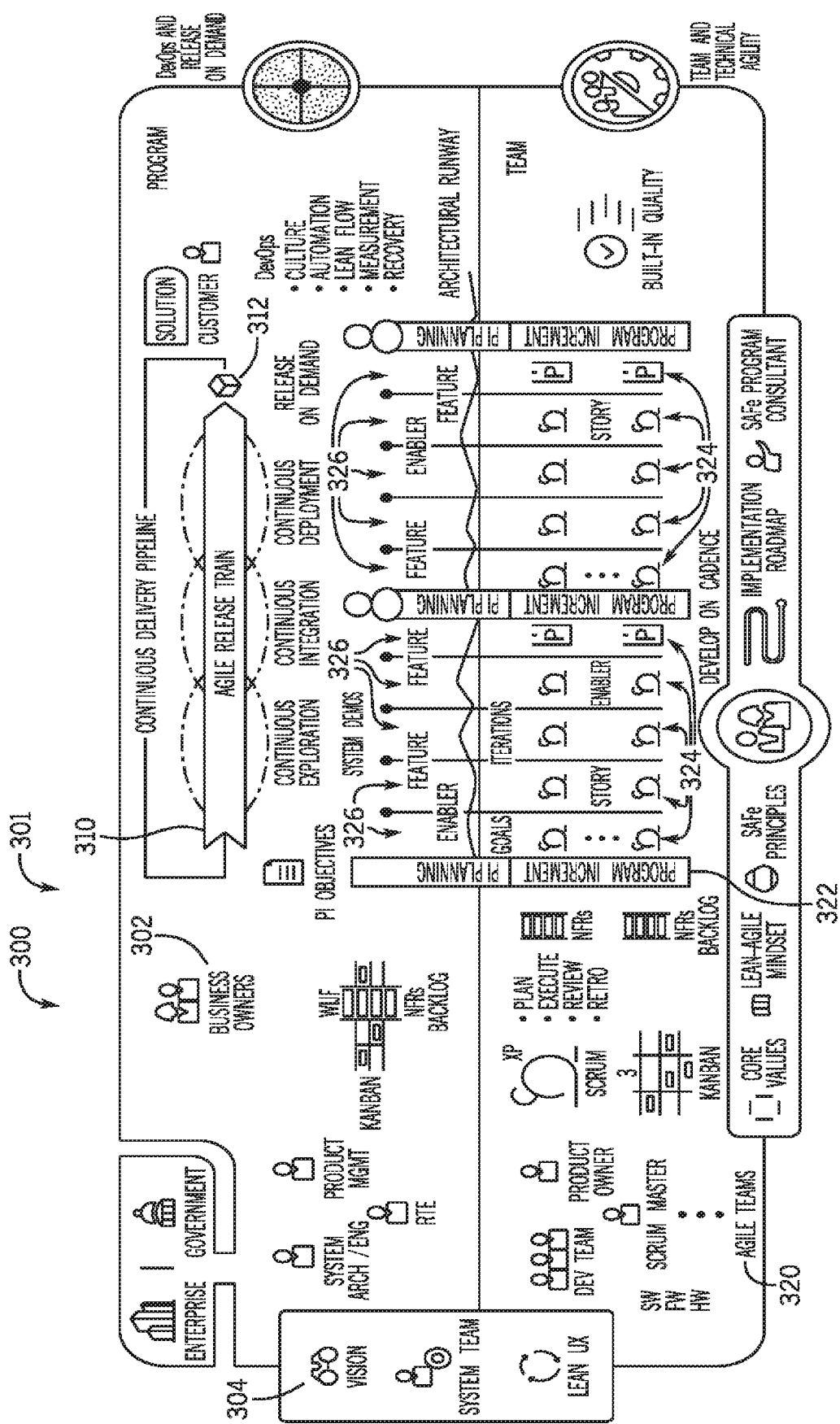
FIG. 3 is an example of various teams within an enterprise employing a scaled agile software development approach, in accordance with aspects of the present approach.

With the preceding in mind, FIG. 3 is an example of various teams within an enterprise 300 employing an agile software development methodology 301, in accordance with aspects of the present approach. In some contexts, business owners 302 may employ a scaled agile methodology 301, such as SAFe™, among others, to centralize project planning operating under a unified structure with a unified vision 304. For example, such a centralized project planning approach may include a Continuous Delivery Pipeline 310 in which workflows, activities, and the needed automation is iteratively developed and updated until release 312 (e.g., release).

Such iterative development may be coordinated among teams 320 assigned various projects for completion in anticipation of an ultimate release 312. In some contexts, development may be organized by a Program Increment (PI) Planning methodology 322 using the scaled agile methodology 301. The PI Planning methodology 322 may be useful in ensuring various teams work toward a common task. For example, the PI Planning methodology 322 may organize timing data for various stories 324 forming part of features 326 assigned to different teams. In this manner, various teams may be aware of upcoming enterprise-wide deadlines associated with stories 324 and features 326.

While the PI Planning methodology 322 may allow team members to modify data associated with the stories 324 and data associated with the features 326, data associated with the features 326 may be isolated from data associated with the stories 324. As a result, a team member may be required to open multiple windows, login to their account, and perform other steps, every time the team member wishes to alternate between accessing the features 326 and/or the stories 324. In other existing scaled agile methodologies 301, the team member incorporating the changes to the stories 324 and may be unaware of, or lack the tools necessary for determining, how such a change affects the feature 326 associated with the modified stories 324. Accordingly, present approaches may benefit from improvements regarding developing techniques for toggling between various stories and features, while updating timing data and updating associations between the stories and features in a user friendly interface, the implementation and coordination of which may be difficult to implement in practice.

Figure 4:
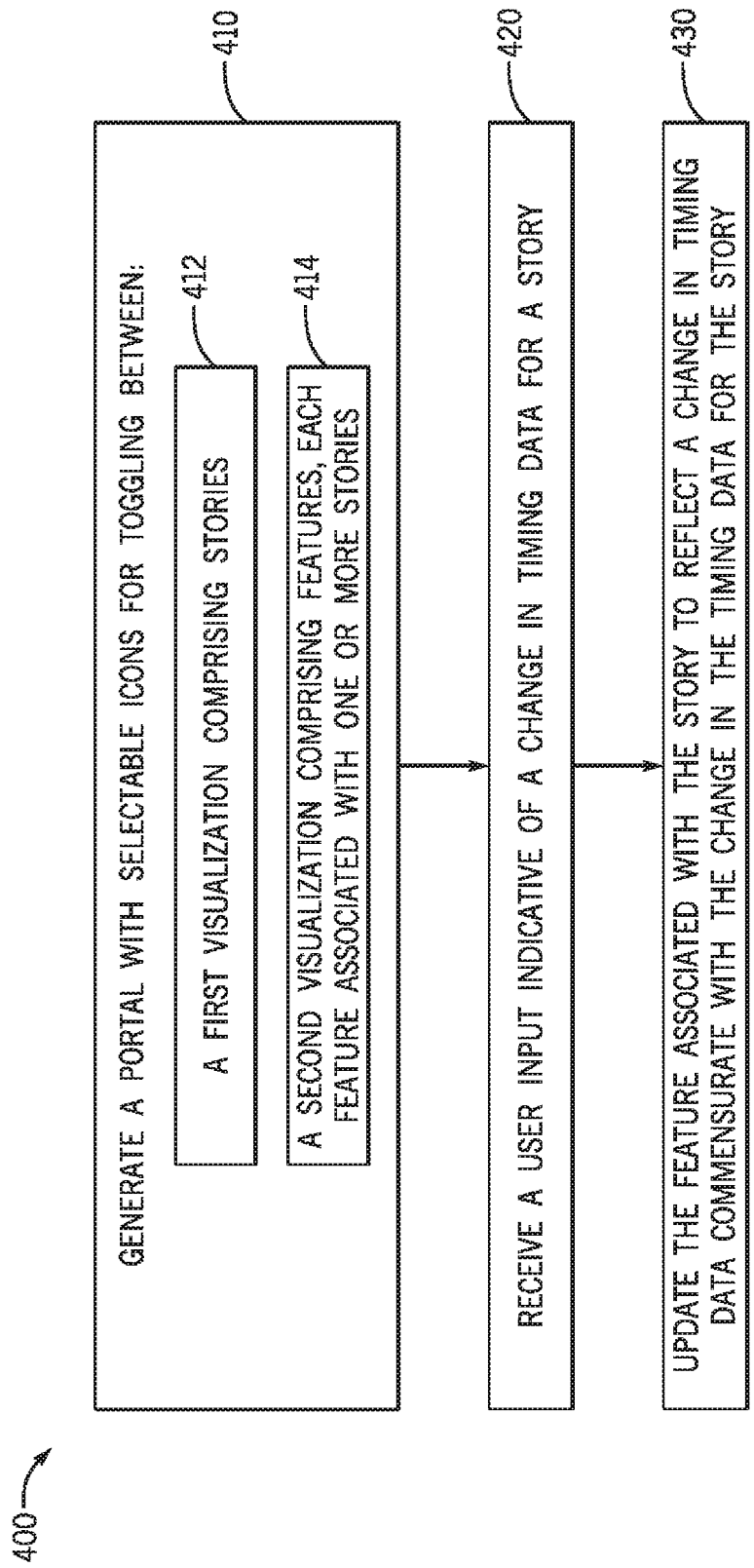
FIG. 4 is a flow diagram of a process for updating an underlying feature in response to receiving a change in timing data for the story, in accordance with aspects of the present approach.

FIG. 4 is a flow diagram of a process 400 for updating underlying data for a feature associated with a story in response to receiving a change in timing data for the story, in accordance with aspects of the present approach, while enabling a user to toggle between a first visualization of the stories and a second visualization of the features. In some contexts, the steps of the process 400 may be stored as code in one or more non-transitory mediums (e.g., memory or other storage of a data server storing instructions and/or the memory 206 of FIG. 2). The instructions may be executed by one or more hardware processors (e.g., of an application server and/or the one or more processors 202 of FIG. 2), such that the one or more hardware processors may execute the code to perform the process 400.

As illustrated, the process includes generating (process 410) a web- or network-accessible portal with selectable icons for toggling between a first visualization 412 and a second visualization 414. The first visualization 412, hereinafter also referred to as "the view of stories" may include a plurality of stories, and the second visualization 414, hereinafter referred to as "the view of features" may include a plurality of features.

The stories in the first visualization 412 may be arranged along a completion timeline, such that the stories may be arranged in order of deadline. For example, the stories having an earlier completion date than other stories may be positioned on a first end (e.g., left end) of the completion timeline, and the stories having a later completion date than other stories may be positioned on a second end (e.g., right end) of the completion timeline. In this manner, a team member having access to the portal may easily determine the order of completion for certain stories. Additionally, the stories may be grouped by assigned team, such that a team member may easily determine stories assigned to her/his team in order of completion date. It should be appreciated that in some embodiments, hovering over a particular story may cause the computing system to generate a pop-up window that includes information associated with the particular story, such as timing data (e.g., a completion date, time left until completion date, and so forth), team data (e.g., assigned team members, group leader, and so forth), and any other relevant information associated with the story.

Similarly, the features in the second visualization 414 may be arranged along a completion timeline, such that the features may be arranged in order of deadline. For example, the features having an earlier completion date than other features may be positioned on a first end (e.g., left end) of the completion timeline, and the features having a later completion date than other features may be positioned on a second end (e.g., right end) of the completion timeline. In this manner, a team member having access to the portal may easily determine the order of completion for certain features. Additionally, the features may be grouped by assigned team, such that a team member may easily determine features assigned to her/his team in order of completion date. It should be appreciated that in some embodiments, hovering over a particular feature may cause the computing system to generate a pop-up window that includes information associated with the particular feature, such as timing data (e.g., a completion date, time left until completion date, and so forth), team data (e.g., assigned team members, group leader, and so forth), the number of stories associated with the particular feature, and any other relevant information associated with the story.

By generating (process block 410) a portal with selectable icons for toggling between the first visualization 412 and the second visualization 414, a team member may be able to quickly identify how a change in stories alters the corresponding feature. The computing system may receive (process block 420) a user input indicative of a change in timing data for a particular story. For example, a user may change timing data for a particular story, such that the particular story is assigned an earlier deadline, making the particular story due for completion earlier than other stories.

In response to this change in timing data for the particular story, the computing system may update (process block 430) the feature associated with the story to reflect the change in timing data for the particular story. That is, since the features are comprised of one or more stories, the computing system may update the feature to reflect any changes in timing data associated with any of its one or more of its component or otherwise associated stories.

Figure 5:
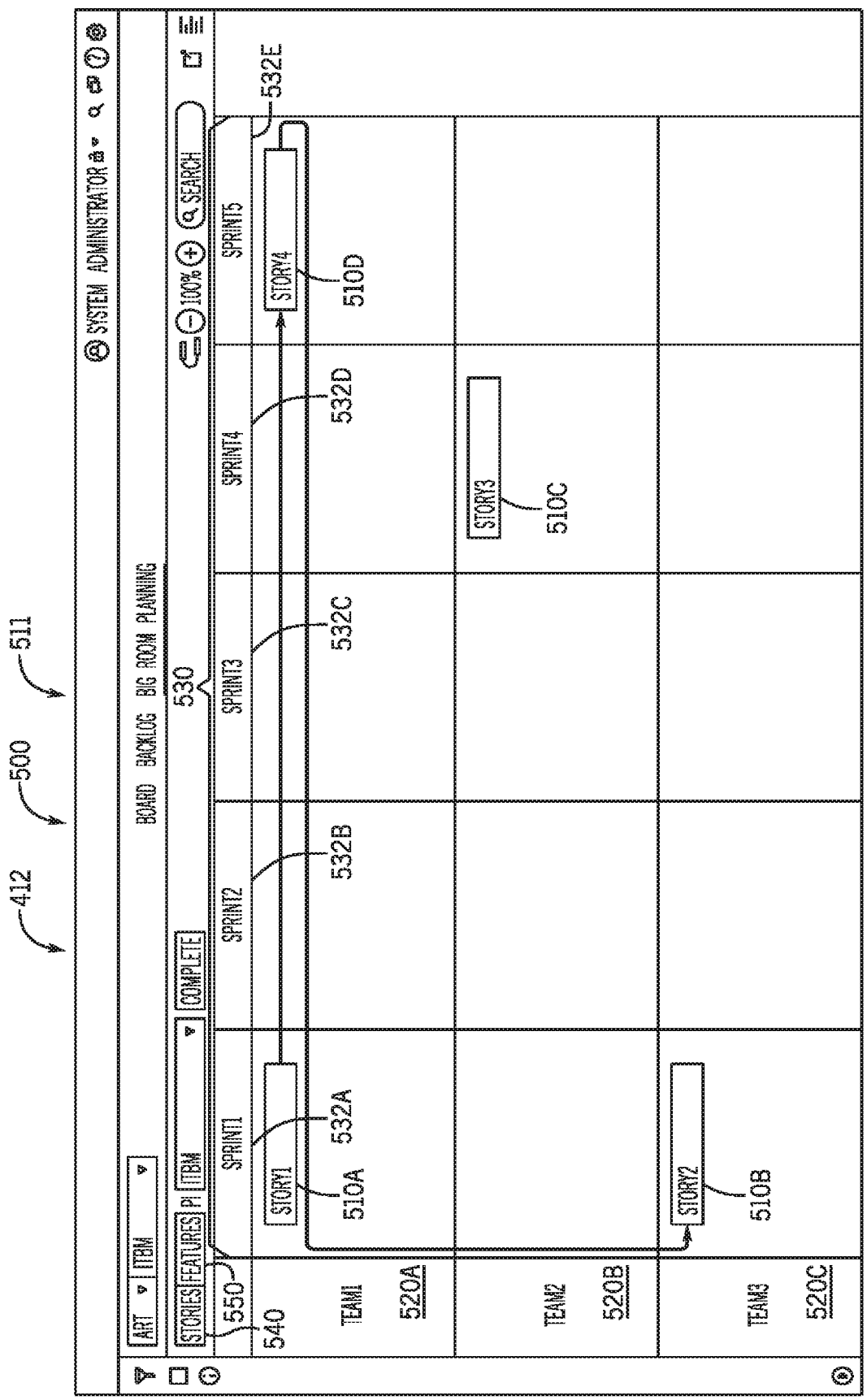
FIG. 5 is a screenshot of a view of stories, such that each story corresponds to a team, such that the stories are arranged along a completion timeline, in accordance with aspects of the present approach.

To help illustrate, FIG. 5 is a screenshot of a view 500 of stories 510 generated on a portal 511, such that each story 510 corresponds to a team 520, such that the stories 510 are arranged along a completion timeline 530, in accordance with aspects of the present approach. The illustrated portal may be generated by a computing system and include the first visualization 412 (i.e., the view 500 of stories 510). As illustrated, the completion timeline 530 may be divided into sprints 532, referring to any period of time, such as three weeks or so, during which a corresponding story is to be completed. For example, a first story 510A and second story 510B are to be completed during the first sprint 532A, no stories are to be completed during the second sprint 532B and the third sprint 532C, a third story 510C is to be completed during the fourth sprint 532D, and a fourth story 510D is to be completed during the fifth sprint 532.

Furthermore, in the illustrated example, a first team 520A is assigned the first story 510A and the fourth story 510D for completion; a second team 520B is assigned the third story 510C for completion; and a third team 520C is assigned the second story 510B for completion. The stories 510 may be dependent upon one another. For example, the line connecting the first story 510A to the fourth story 510D indicates that the first story 510A is to be completed before the fourth story 510D, and the line connecting the fourth story 510D to the second story 510B indicates that the fourth story 510D is to be completed before the second story 510B. Therefore, the view 500 of the stories 510 may provide a visualization showing dependencies between stories 510.

The portal 511 includes a stories selectable icon 540 and a features selectable icon 550. In the illustrated embodiment, the stories selectable icon 540 is selected. Indeed, the computing system may present the view 500 of stories 510 in response to selection of the stories selectable icon 540. As discuss below with regard to FIG. 9, selection of the features selectable icon 550, causes the computing system to present a view of features (i.e., the second visualization 414 of FIG. 4).

Figure 6:
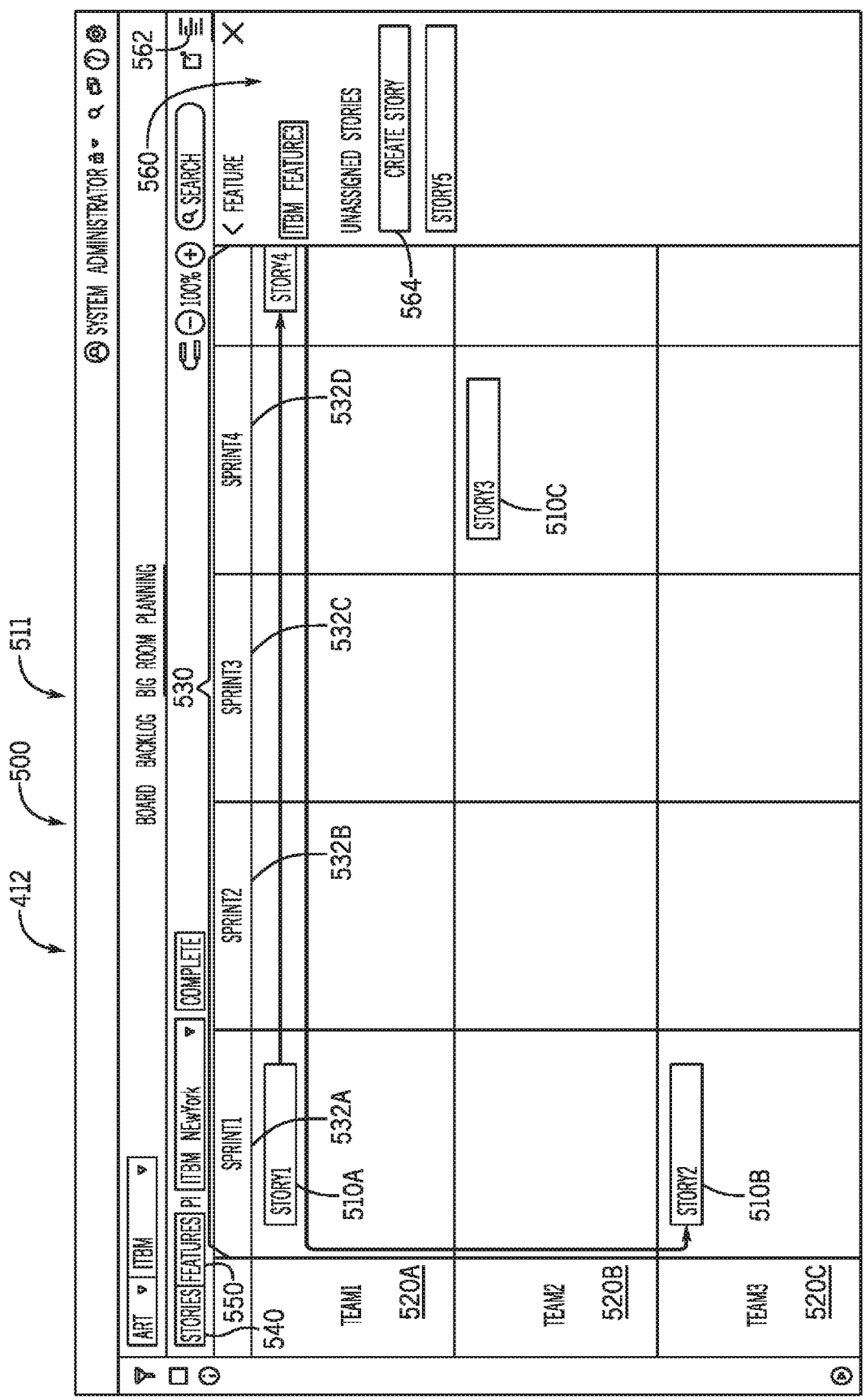
FIG. 6 is a screenshot of an example of a panel for creating new stories, in accordance with aspects of the present disclosure.

FIG. 6 is a screenshot of an example of a panel 560 for creating new stories 510, in accordance with aspects of the present disclosure. The team member having access to the portal 511 may select the panel icon 562 to cause the computing system to present the panel 560. The panel includes a create story icon 564 for creating a story. The panel 560 may include a text box or drop down menu for specifying a name of the newly created story and for assigning the newly created story to a feature. The computing system may add the newly created story to the first visualization 412 (i.e., the view 500 of stories 510) in response to selection of the create story icon 564.

Figure 7:
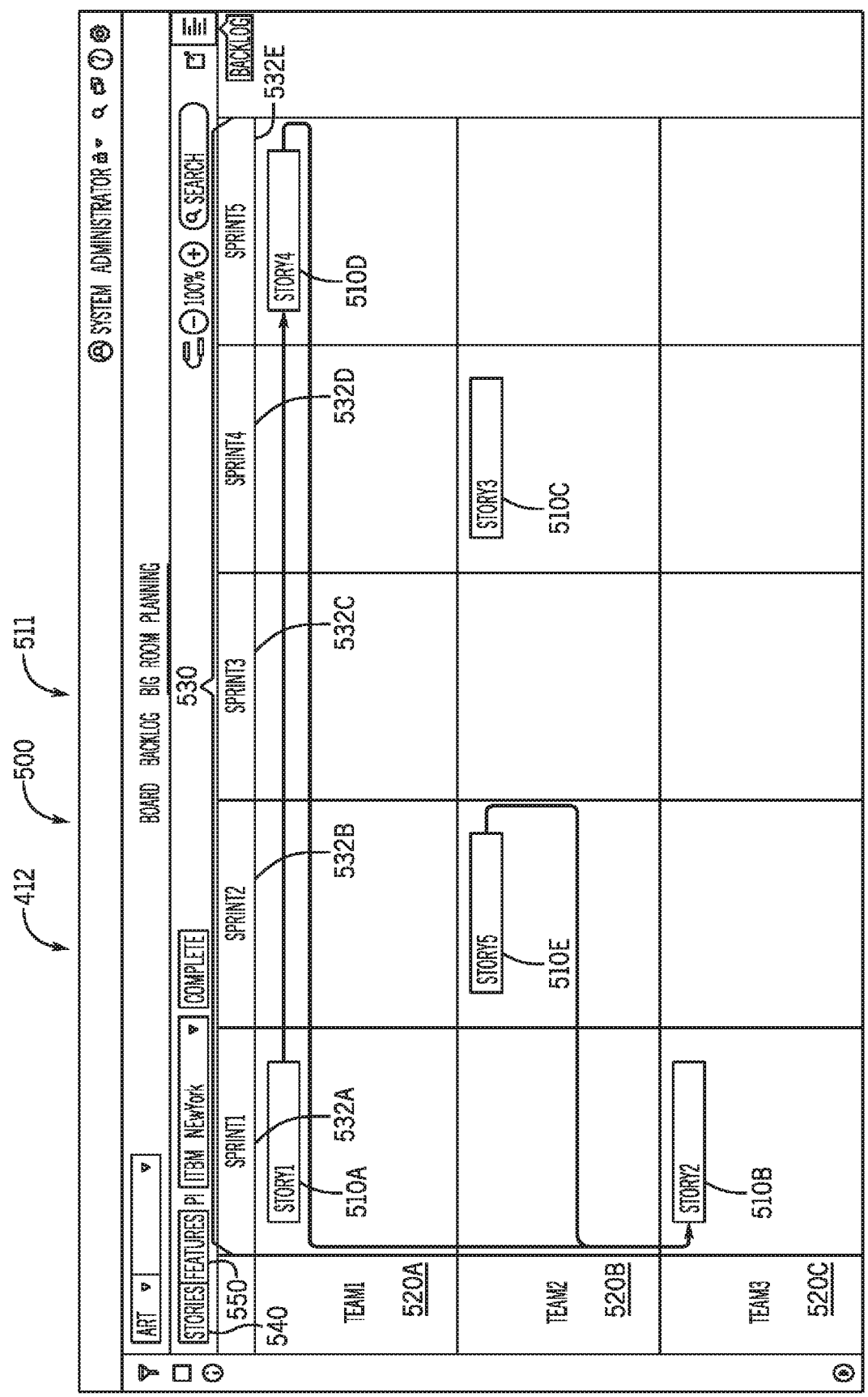
FIG. 7 is a screenshot of the view of stories of FIG. 5, including the newly created story of FIG. 6, such that the newly created story of FIG. 6 is out of order with respect to other stories, in accordance with aspects of the present disclosure.

FIG. 7 is a screenshot of the view 500 of stories 510 of FIG. 5, including the newly created story 510E of FIG. 6, such that the newly created story 510E of FIG. 6 is out of order with respect to other stories 510, in accordance with aspects of the present disclosure. The newly created story 510E is out of order with respect to other stories 510 because the line connecting the newly created story 510E to the second story 510B indicates that the second story 510B depends from the newly created story 510E, such that the newly created story 510E should be completed before the second story 510B. Similarly, as discussed above, the line connecting the fourth story 510D to the second story 510B indicates that the fourth story 510D is to be completed before the second story 510B. To allow a team member to easily rearrange the position of the stories along the completion timeline, the stories 510 may be selected and dragged to their desired position along the completion timeline. In this manner, a team member may rearrange the order at which the stories are planned to be completed.

Figure 8:
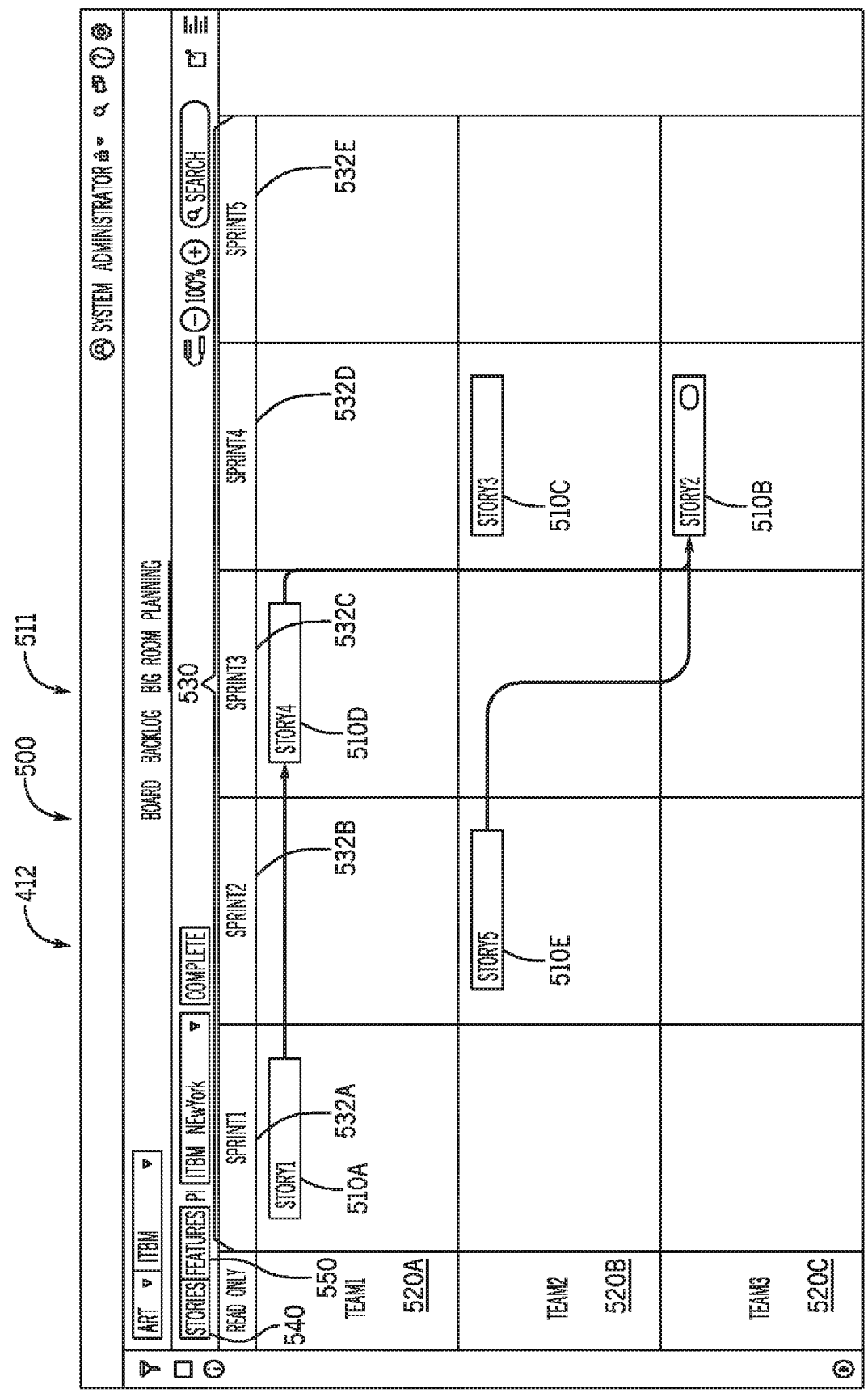
FIG. 8 is a screenshot of the view of stories of FIG. 5, such that the newly created story may be selected and dragged to a target position along the completion timeline of FIG. 5, in accordance with aspects of the present disclosure.

FIG. 8 is a screenshot of the view of stories of FIG. 5, such that the newly created story 510E may be selected and dragged to a target position along the completion timeline of FIG. 5, in accordance with aspects of the present disclosure. In some contexts, all the stories 510 may be selected and dragged such that each of the stories 510 may be positioned to the target sprint 532 along the completion timeline. As illustrated, to ensure that the stories 510 are ordered in accordance with the dependencies between the stories 510, the team member may select and drag the fourth story 510D from the fifth sprint 532E to the third sprint 532C; and select and drag the second story 510B from the first sprint 532A to the fourth sprint 532D. In this manner, the order of completion between the stories complies with the dependencies between the stories 510, as defined by the lines between stories.

While in the illustrated example, the computing system enables the team member to freely reorder the stories 510 by assigning the stories to desired sprints 532, it should be understood that in some embodiments, the computing system may restrict functionality based on an identity of the team member. For example, a first subset of team members may only have viewing access to the stories, a second subset of team members may only be allowed to reassign the stories 510 for which their team is responsible for completing to a desired sprint 532, and a third subset of team members may be granted access only to assign one story 510, each based on an identity of the team member.

A member may wish to view how reassigning stories to another sprint 532 may affect the features that include those stories. To view the second visualization 414, the user may select the features selectable icon 550. In response to receiving selection of the features selectable icon 550, the computing system may present the second visualization 414, including a view of the features, as illustrated in the embodiment of FIG. 9.

Figure 9:
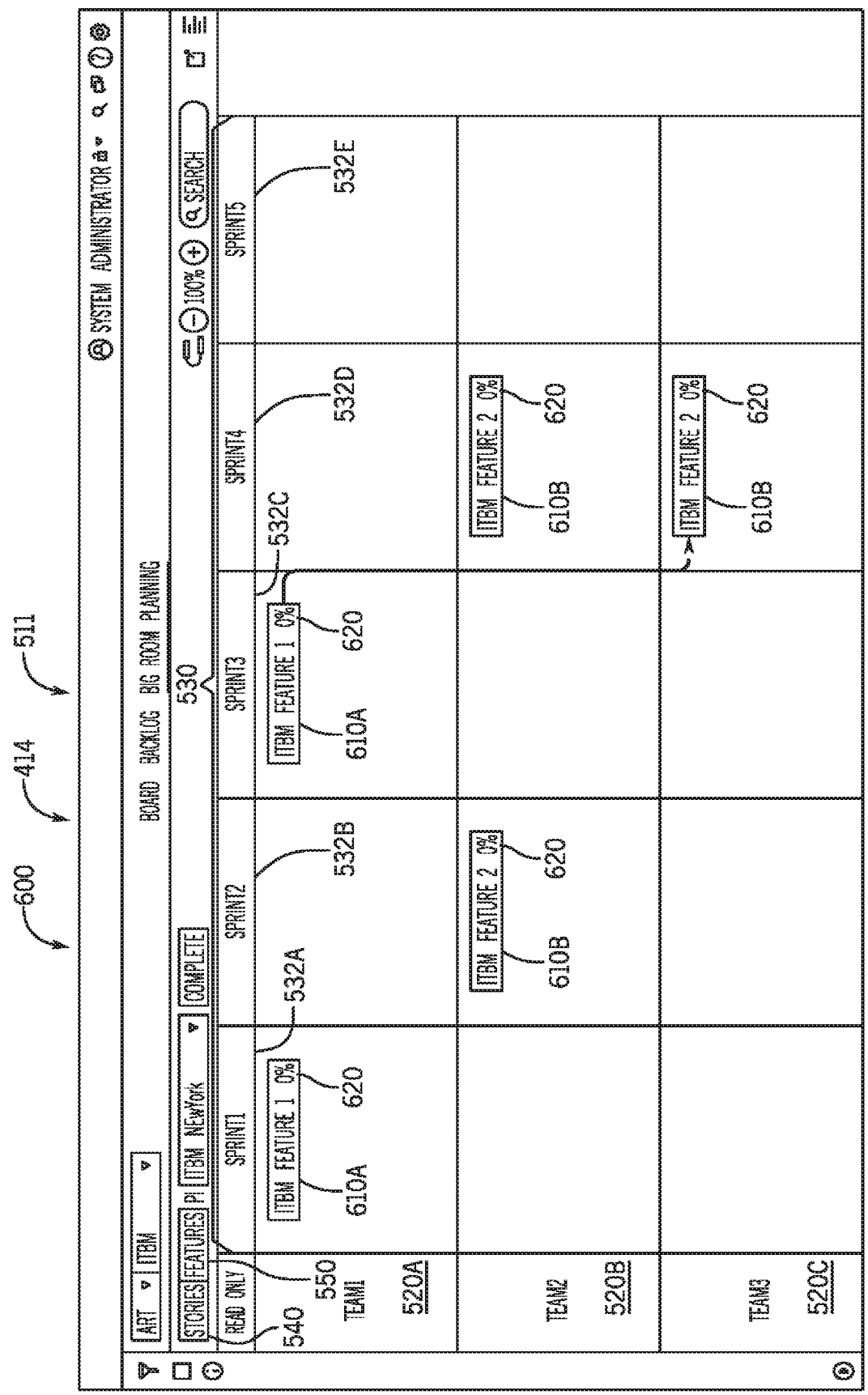
FIG. 9 is a is a screenshot of a view of features, such that each feature is associated with one or more of the stories of FIGS. 5-8, such that the features are arranged along the completion timeline of FIG. 5, in accordance with aspects of the present approach.

To that end, FIG. 9 is a is a screenshot of a view 600 of features 610, such that each feature 610 is associated with one or more of the stories 510 of FIGS. 5-8, and such that the features 610 are arranged along the completion timeline 530 of FIG. 5, in accordance with aspects of the present approach. The illustrated portal 411 may be generated by a computing system in response to receipt of a team member's selection of the features selectable icon 550. The portal 411 may include the second visualization 414 (i.e., the view 500 of stories 502). As illustrated, the completion timeline 530 may be divided into sprints 532, referring to any period of time, such as three weeks or so, during which a corresponding story is to be completed. For example, a first feature 610A is presented on the first sprint 532A and on the third sprint 532C to indicate that the first feature 610A will have at least one story 510 due for completion at these aforementioned sprints 532 by the first team 520A; a second feature 610B is presented on the second sprint 532B and the fourth sprint 532D to indicate that the second feature 610B will have at least one story due for completion at these aforementioned sprints 532 by the second team 520B and by the third team 520C.

The view 600 of features 610 may enable a team member to quickly view which features 610 have activity or deadlines (e.g., a deadline for completing a story 510) for what times and which teams are responsible for completing those deadlines. Furthermore, each feature 610 may include a percent complete designation 620. The percent complete designation 620 may indicate the percent complete of the feature 610. For example, when four of five stories 510 associated to a feature are completed, the corresponding percentage complete designation 620 of the feature may indicate 80% to reflect the completion status of the associated stories.

Figure 10:
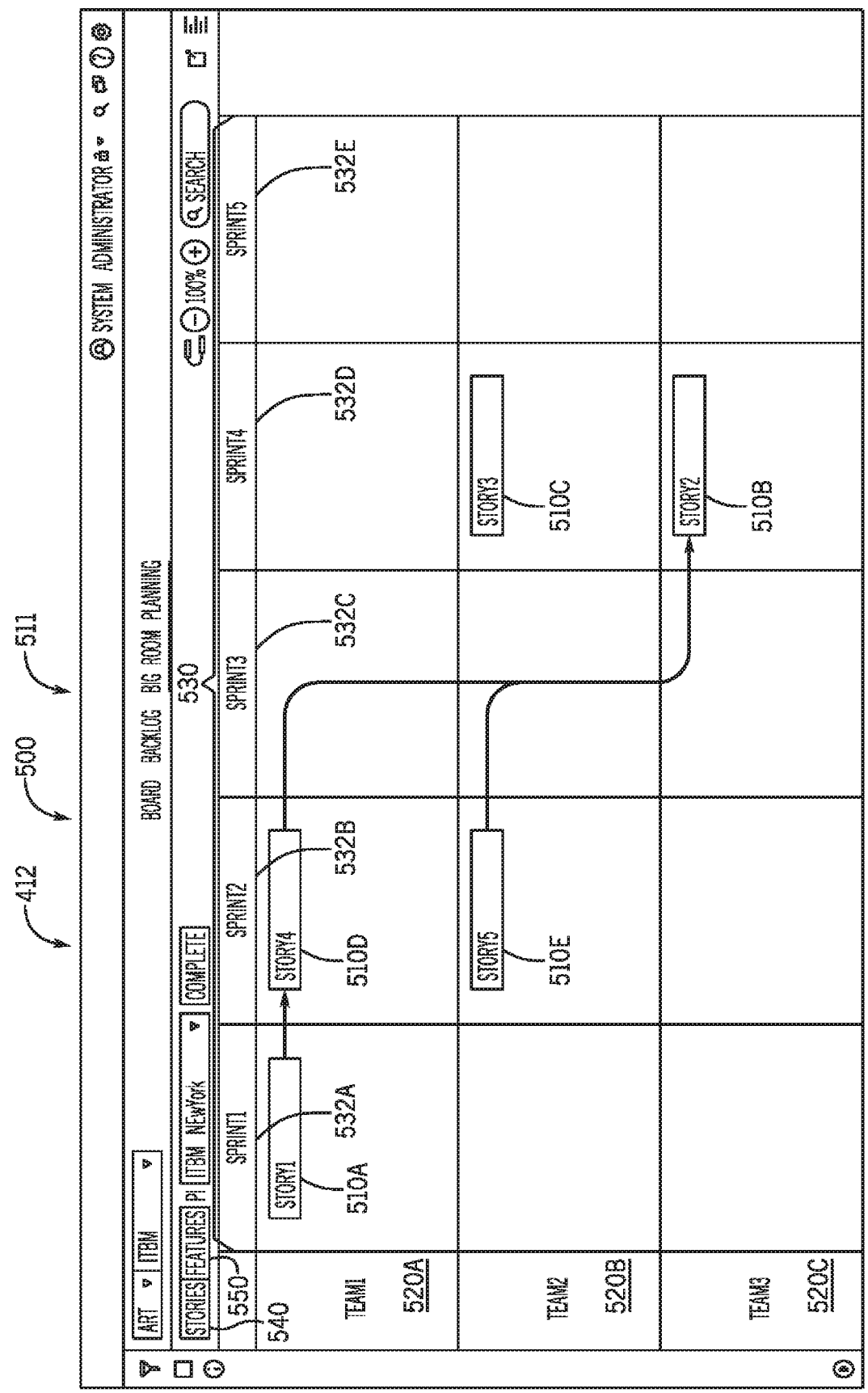
FIG. 10 is a screenshot of the view of stories of FIG. 5, including a change in one story by rearranging the story with respect to the other stories along the completion timeline of FIG. 5.

To toggle from the view 600 of features 610, a team member may select the stories selectable icon 540, whereby the computing system presents the view 500 of stories 510. FIG. 10 is a screenshot of the view 500 of stories 510 of FIG. 5. FIG. 10 shows a change in the fourth story 510, in which the fourth story 510 may be selected by the team member and dragged to another sprint 532. In the illustrated embodiment, the computing system may receive a user input indicate of selection of the fourth story 510D and another user input indicative of dragging the fourth story 510 from the third sprint 532C to the second sprint 532B. In this manner, the fourth story 510D (or any story 510 on the view 600) may by rearranged along the completion timeline of FIG. 5 with respect to the other stories.

In response to receiving any change for the stories, the computing system may update the underlying data associated with that story to reflect the change and may update the underlying data associated with the feature comprised of that story to also reflect the change. To quickly view how this change may have altered the features, the team member may select the features selectable icon 550.

Figure 11:
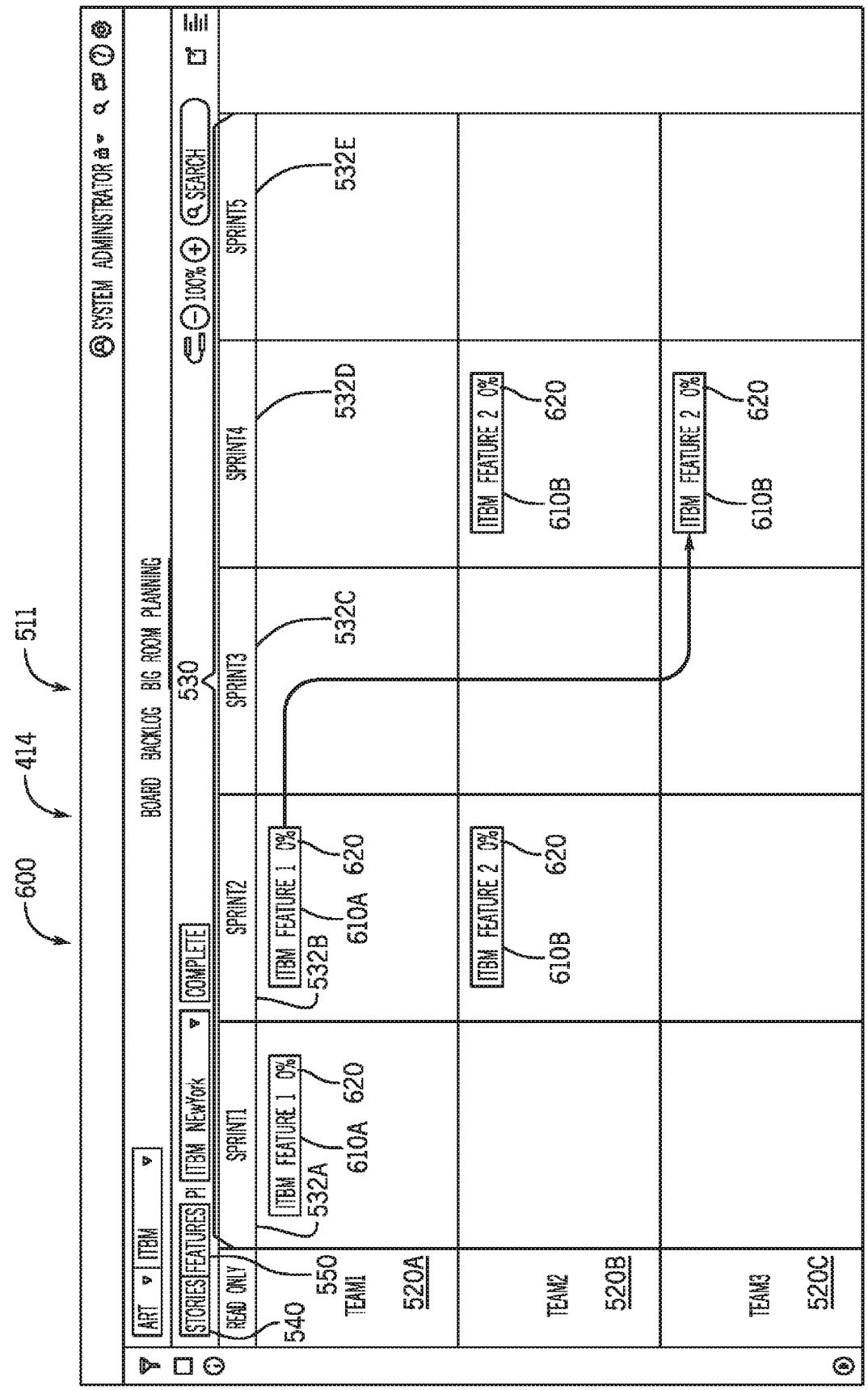
FIG. 11 is a screenshot of the view of features of FIG. 9 automatically updating the feature associated with the rearranged story of FIG. 10, in accordance with aspects of the present approach.

FIG. 11 is a screenshot of the view 600 of features 610 of FIG. 9 automatically reflecting updates to the feature associated with the rearranged story of FIG. 10, in accordance with aspects of the present approach. As may be appreciated, a team member can toggle to the view 600 of features 610 by selecting the features selectable icon 550. As may be appreciated, the view 600 of features 610 may reflect the change of the fourth story 510D from FIG. 10 because the computing system may update the features 610 in response to changes in their associated stories 510. In this example, because the time for completion for the fourth story 510D was changed from third sprint 532C to the second sprint 532B, the associated feature, in this example, the first feature 610A has also changed from third sprint 532C to the second sprint 532B. By employing the embodiments disclosed herein, a computing system may synchronize the data between stories and features, such that when a story is changed, the features that includes that changed story is updated to reflect the change. Furthermore, by employing the embodiments disclosed herein, a user may then toggle between a view of the stories and a view of the features via a single click to identify how an update to a story changes the features, thereby saving time and resources, while improving operations for agile development methodologies.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Technical effects of the present disclosure include improving operations for enterprises employing scaled agile methodologies. Present embodiments include systems and methods for generating a portal accessible to an assigned team member, such that the portal includes selectable icons for toggling between a first visualization indicative of stories and a second visualization indicative of features. As mentioned above, certain stories may collectively form the features, such that the underlying data between a specific feature and the stories associated with the specific feature may be similar and/or related. To that end, present embodiments include updating the underlying data associated with the specific feature in response to receipt of a user input indicative of a change to at least one of the stories associated with the specific feature. For example, in response to a user changing the timing data for one story associated with the feature, present embodiments include updating the specific feature based on the user change to the timing data for the one story. In this manner, a team member may toggle between the first visualization and second visualization by making a single selection, thereby saving time and resources, while improving the efficiency by which projects are planned using a scaled agile methodology.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f).

However, for any claims containing elements designated in any other manner, it is intended that such elements are not to be interpreted under 35 U.S.C. 112(f).

The invention claimed is:

1. A system configured to toggle between displaying visualizations of stories and of features within an agile development framework, the system comprising:
   a memory device; and
   one or more hardware processors configured to read instructions from the memory device and execute the instructions to perform operations comprising:
      generating a portal visualization with a selectable icon, that when engaged, toggles between a first visualization and a second visualization, wherein the first visualization comprises a plurality of stories with a corresponding dependency indication between the plurality of stories, wherein the second visualization comprises a plurality of features without the corresponding dependency indication between the plurality of features, wherein respective subsets of the plurality of stories correspond to the plurality of features such that team data and timing data is preserved through the toggling between the first visualization and the second visualization, wherein the plurality of stories of the first visualization and the plurality of features of the second visualization are organized in the first visualization and the second visualization, respectively, along a first axis indicative of time based on the timing data and a second axis indicative of a plurality of teams based on the team data, and wherein the first axis is divided into a plurality of sprints along a timeline and the second axis is divided into the plurality of teams;
      updating a feature of the plurality of features in the second visualization in response to receipt of a modification indicative of a change in the first visualization to a story of the plurality of stories associated with the feature; and
      receiving a selection of the selectable icon to toggle between the first visualization and the second visualization.

2. The system of claim 1, wherein the operations comprise, in response to the selection of the selectable icon, presenting the first visualization.

3. The system of claim 1, wherein the operations comprise, in response to the selection of the selectable icon, presenting the second visualization, wherein the second visualization reflects the update to the feature in response to the receipt of the modification indicative of the change in the first visualization to the story associated with the feature.

4. The system of claim 1, wherein the modification comprises altering an order of the story of the plurality of stories relative to other stories of the plurality of stories, wherein updating the feature comprises changing a timing for completing the feature commensurate with the modification.

5. The system of claim 1, wherein the plurality of stories are arranged in chronological order of completion with respect to one another along the plurality of sprints, wherein each story of the plurality of stories is assigned to a particular sprint of the plurality of sprints.

6. The system of claim 5, wherein the plurality of features are arranged in the chronological order along the plurality of sprints.

7. The system of claim 5, wherein the modification comprises assigning the story to another sprint different than an original sprint assigned to the story.

8. The system of claim 7, wherein updating the feature comprises modifying underlying script associated with the feature to reflect the assignment of the story to the other sprint.

9. A method to toggle between views within an interface related to an agile development framework, the method comprising:
   generating a portal visualization with a selectable icon, that when engaged, toggles between a first visualization and a second visualization, wherein the first visualization comprises a plurality of stories with a corresponding dependency indication between the plurality of stories, wherein the second visualization comprises a plurality of features without the corresponding dependency indication between the plurality of features, wherein respective subsets of the plurality of stories correspond to the plurality of features such that team data and timing data is preserved through the toggling between the first visualization and the second visualization, wherein the plurality of stories of the first visualization and the plurality of features of the second visualization are organized in the first visualization and the second visualization, respectively, along a first axis indicative of time based on the timing data and a second axis indicative of a plurality of teams based on the team data, and wherein the first axis is divided into a plurality of sprints along a timeline and the second axis is divided into the plurality of teams;
   updating a feature of the plurality of features in the second visualization in response to receipt of a modification indicative of a change in the first visualization to a story of the plurality of stories associated with the feature; and
   receiving a selection of the selectable icon to toggle between the first visualization and the second visualization.

10. The method of claim 9, comprising, in response to the selection of the selectable icon, presenting the first visualization.

11. The method of claim 9, comprising, in response to the selection of the selectable icon, presenting the second visualization, wherein the second visualization reflects the update to the feature in response to the receipt of the modification indicative of the change in the first visualization to the story associated with the feature.

12. The method of claim 9, wherein the modification comprises altering an order of the story of the plurality of stories relative to other stories of the plurality of stories, wherein updating the feature comprises changing a timing for completing the feature commensurate with the modification.

13. The method of claim 9, wherein the plurality of stories are arranged in chronological order of completion with respect to one another along the plurality of sprints, wherein each story of the plurality of stories is assigned to a particular sprint of the plurality of sprints.

14. A non-transitory computer readable medium comprising computer readable code, that when executed by one or more processors, causes the one or more processors to perform operations comprising:
   generating a portal visualization with a selectable icon, that when engaged, toggles between a first visualization and a second visualization, wherein the first visualization comprises a plurality of stories with a corresponding dependency indication between the plurality of stories, wherein the second visualization comprises a plurality of features without the corresponding dependency indication between the plurality of features, wherein respective subsets of the plurality of stories correspond to the plurality of features such that team data and timing data is preserved through the toggling between the first visualization and the second visualization, wherein the plurality of stories of the first visualization and the plurality of features of the second visualization are organized in the first visualization and the second visualization, respectively, along a first axis indicative of time based on the timing data and a second axis indicative of a plurality of teams based on the team data, and wherein the first axis is divided into a plurality of sprints along a timeline and the second axis is divided into the plurality of teams;

updating a feature of the plurality of features in the second visualization in response to receipt of a modification indicative of a change in the first visualization to a story of the plurality of stories associated with the feature; and receiving a selection of the selectable icon to toggle between the first visualization and the second visualization.

15. The non-transitory computer readable medium of claim 14, wherein the operations comprise in response to the selection of the selectable icon, presenting the first visualization.

16. The non-transitory computer readable medium of claim 14, wherein the operations comprise in response to the selection of the selectable icon, presenting the second visualization, wherein the second visualization reflects the update to the feature in response to the receipt of the modification indicative of the change in the first visualization to the story associated with the feature.

17. The non-transitory computer readable medium of claim 14, wherein the modification comprises altering an order of the story of the plurality of stories relative to other stories of the plurality of stories, wherein updating the feature comprises changing a timing for completing the feature commensurate with the modification.

18. The non-transitory computer readable medium of claim 14, wherein the plurality of stories are arranged in chronological order of completion with respect to one another along the plurality of sprints, wherein each story of the plurality of stories is assigned to a particular sprint of the plurality of sprints.

19. The non-transitory computer readable medium of claim 18, wherein the plurality of features are arranged in the chronological order along the plurality of sprints.

* * * * *